J. C. PEDRICK.
Grain Drier.
No. 16,259.
Patented Dec. 16, 1856.
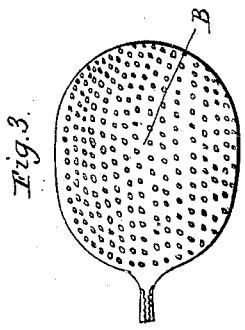
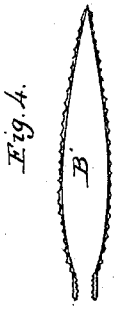
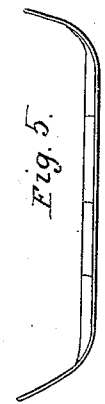
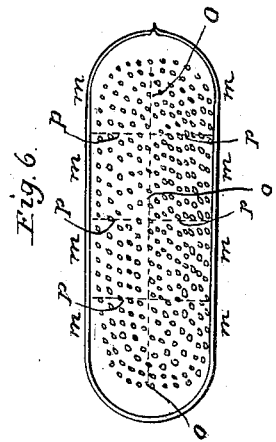
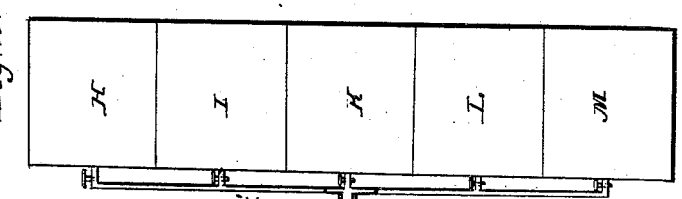
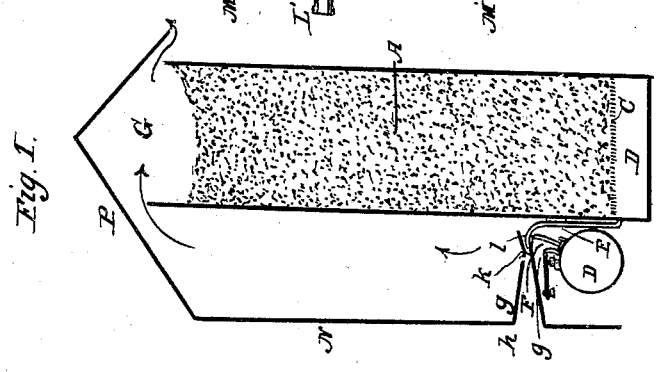

UNITED STATES PATENT OFFICE.

JOHN C. PEDRICK, OF WASHINGTON, DISTRICT OF COLUMBIA.

APPARATUS FOR DRYING GRAIN IN THE MASS.

Specification of Letters Patent No. 16,259, dated December 16, 1856.

*To all whom it may concern:*

Be it known that I, JOHN C. PEDRICK, of Washington, District of Columbia, have invented a new and useful Method of Drying Grain and other Equivalent Substances, the process of which is usually denominated "kiln-drying grain," of which improvement the following is hereby declared to be a full and exact description, reference being had to the accompanying drawings and to the letters and reference figures marked thereon.

Figure 1 represents a section of a bin with grain, together with a steam-boiler and an exhausting apparatus. Fig. 2 is a plan of several bins so arranged as to be worked together. Fig. 3 is a bird's eye view and Fig. 4 a vertical longitudinal section of the perforate exhaust chamber. Fig. 5 represents a vertical section of a grain vessel, and Fig. 6 a bird's eye view of the same.

The nature of my invention consists in an improvement for drying grain, the following being a full description of the invention and the mode of carrying on its operation.

I use a double convex lenticular vessel B' as shown in Figs. 3 and 4, generally of sheet metal and perforate with numerous small holes as may be seen by inspection. This vessel is designed to be used in cases where bins or vessels have not been fitted up with false or perforated bottoms as seen at Fig. 1, and being a substitute therefor. This vessel B' is of such form as to allow of its being forced down through the grain into the midst of that part which is found to be heating or become wet. It is sometimes thrust through an opening into the side of the bin or mass of grain that may be undergoing change. This vessel B' may be made of any form or size to suit the bin, or vessel of grain to which it is intended to be applied. It may be thrust in horizontally near the bottom of a mass of grain, and be large enough to extend quite across the bin or mass of grain horizontally; and would in that case do the work of a temporary false bottom perforated while it possessed the advantages of being transferred from place to place as might be required. In using my lenticular vessel I apply to the mouth of B' any exhausting apparatus, as tube $g$, $g$, in Fig. 1, or a common double acting pump.

What I claim as my invention and desire to secure by Letters Patent is—

The double concave lenticular vessel or perforate exhaust chamber B' or its equivalent, constructed and operated as herein set forth for drying grain in bulk, in granaries or in vessels.

JOHN C. PEDRICK.

Witnesses:
 B. K. MORSELL,
 JAMES A. COOPER.